United States Patent [19]

Shah et al.

[11] 4,080,430

[45] Mar. 21, 1978

[54] DECOMPOSITION OF CUPRIC OXIDE USING A REDUCING SCAVENGER

[75] Inventors: Ishwarlal D. Shah, Edina; Peter L. Ruzzi, Eagan; Robert B. Schluter, Bloomington, all of Minn.

[73] Assignee: The United States of America as represented by the Secretary of the Interior, Washington, D.C.

[21] Appl. No.: 806,116

[22] Filed: Jun. 10, 1977

[51] Int. Cl.² ............................................. C01G 3/02
[52] U.S. Cl. .................................... 423/274; 423/604
[58] Field of Search ....................... 423/604, 274, 265

[56] References Cited

U.S. PATENT DOCUMENTS

| 2,184,617 | 12/1939 | Hurd | 423/604 |
| 2,385,066 | 9/1945 | Du Rose | 423/604 |
| 2,554,319 | 5/1951 | Ayers | 423/604 |

FOREIGN PATENT DOCUMENTS

| 458,085 | 3/1970 | Japan | 423/604 |

*Primary Examiner*—O. R. Vertiz
*Assistant Examiner*—Brian E. Hearn
*Attorney, Agent, or Firm*—William S. Brown; Donald A. Gardiner

[57] ABSTRACT

Cupric oxide is heat-decomposed in the presence of an oxygen scavenger, such as solid carbon, to produce high quality cuprous oxide suitable for use as a pigment.

7 Claims, No Drawings

DECOMPOSITION OF CUPRIC OXIDE USING A REDUCING SCAVENGER

BACKGROUND OF THE INVENTION

This invention relates to the production of cuprous oxide from cupric oxide or mixtures of cupric oxide and minor amounts of cuprous oxide and/or metallic copper. The cuprous oxide product is of sufficient purity to be used as a pigment.

Cuprous oxide, also known as red copper oxide, finds extensive use as a pigment in antifouling paints, as an agricultural fungicide, as a porcelain glaze and in a variety of other uses. There are a number of known ways to manufacture cuprous oxide. It can be produced by the high temperature air oxidation of metallic copper, by the addition of bases to aqueous solutions of cuprous salts such as cuprous chloride, by the action of glucose on cupric hydroxide and by the selective reduction of cupric oxide.

Substantial quantities of mixed copper oxides are produced as byproducts of copper refining and fabrication, as scale from the anodes of copper refineries, from certain wrought copper products after annealing and from drawing wire. Use of this byproduct as the raw material for production of highgrade cuprous oxide offers substantial economic advantages as compared to the use of other copper-containing source materials.

It has been proposed to produce cuprous oxide by the reduction of cupric oxide using carbon as a solid reducing agent. This process is illustrated by the Ayers patent, U.S. Pat. NO. 2,554,319. Ayers teaches the mixing of finely-divided cupric oxide and carbon in stoichiometric proportions and passing the mixture through a heating zone at a temperature of about 1400° C whereby reduction of the cupric oxide is accomplished. Carbon is oxidized to carbon monoxide. Finely-divided carbon is necessary in Ayers' process as lumps or aggregates of carbon cause reduction of cupric oxide adjacent the carbon lumps to metallic copper.

It is also known from thermodynamic data that cupric oxide will thermally decompose to cuprous oxide and oxygen at relatively high temperatures. For example, the partial pressure of oxygen inequilibrium with cupric and cuprous oxide at 1200° K is approximately 0.025 atm. Thus, the decomposition of cupric oxide at 1200° K should proceed as long as the oxygen pressure in the reaction environment is kept well below 0.025 atm. This can be done in theory by flowing an inert gas through the reaction zone to flush the oxygen product or by carrying out the decomposition in vacuum. In practice, these procedures require higher temperatures to attain practical reaction rates but with cupric oxide, maximum temperature is limited to about 950° C, or about 1223° K, as sintering begins at about that temperature.

SUMMARY OF THE INVENTION

Cupric oxide, or mixtures of cupric oxide with minor amounts of cuprous oxide and/or metallic copper, is thermally decomposed to produce cuprous oxide suitable for pigment use. The reaction is carried out at a temperature above about 850° C but below the sintering temperature of cupric oxide in the presence of a scavanger, such as carbon, which will react with oxygen to yield a gaseous product. Direct solid state reduction of copper oxides to metallic copper is prevented by providing the oxygen scavenger in large particle or lump form, such as blocks of graphite. Provision of a flowing gaseous atmosphere, stable to cuprous oxide, aids in transferring oxygen to the scavenger and tends to flush part of the oxygen from the reaction chamber, thus further enhancing reaction rate.

Hence, it is an object of this invention to produce high-quality cuprous oxide by thermal decomposition of cupric oxide.

It is a further object of this invention to increase the reaction rate of cupric oxide decomposition by providing a reactive scavenger for the released oxygen.

Yet another object of this invention is to produce pigment quality cuprous oxide from byproduct cupric oxide.

DETAILED DESCRIPTION OF THE INVENTION

Cupric oxide may be thermally decomposed to cuprous oxide by heating at a relatively high temperature and removing the oxygen as it is formed. As this is an equilibrium reaction, the reaction products depend upon both the oxygen pressure within the reaction zone and upon reaction temperature. At a reaction temperature of 1100° K (827° C), the equilibrium oxygen pressure is but 0.002 atm while at 1200° K, the oxygen pressure increases to 0.025 atm. These data define a minimum practical reaction temperature of about 850° C. While the reaction will proceed at even lower temperatures, the reaction rate is so slow as to be impractical. On the other hand, the upper limit of reaction temperature is defined by the sintering temperature of cupric oxide. This is about 950° C.

The process is carried out in a closed reaction vessel which is preferably a rotating, indirectly heated roasting drum or kiln. In a preferred embodiment, a scavenging gas is passed at a relatively slow rate through the reaction vessel. The gas used must be stable toward cuprous oxide and may also be unstable toward cupric oxide and metallic copper. An essentially inert gas, such as nitrogen or argon, may be used or a gas or gas mixture which is oxidizing toward metallic copper but reducing toward cupric oxide is advantageous. This latter category of gases includes carbon monoxide, carbon dioxide, steam and similar gases and mixtures thereof.

Three functions are performed by the scavenging gas. First, by maintaining the gas pressure within the reaction vessel at a pressure equal to or slightly greater than atmospheric, air leakage into the reaction vessel is essentially precluded. Second, the scavenging gas acts as a carrier or transfer medium for the reaction of oxygen with a solid oxygen scavenger material within the reaction vessel. Lastly, some oxygen is carried from the reaction vessel by the circulating gas. Gas circulation through the reaction vessel is maintained at a relatively slow rate; the flow being sufficient to replace the total volume of gas in the reactor in about 0.1 to 10 minutes. As the decomposition of cupric oxide is an endothermic reaction, a large gas flow tends to cool the reaction vessel; and thus, a limit is reached whereat the flow rate of gas through the reactor is restricted by the heat requirements of the reaction.

A solid, oxygen scavenger is provided within the reaction vessel which chemically combines with evolved oxygen. It is preferred to use a solid scavenger such as carbon which reacts with oxygen to form a gaseous product. Other solid scavengers, such as titanium metal, can be used as well; but these are less preferred as their reaction product with oxygen is a solid which has a tendency to contaminate the cuprous oxide product. If such contamination does not affect the end use of the product cuprous oxide, then titanium and like scavengers are not objectionable.

It is also imperative, when using a solid scavenger such as carbon, to prevent direct reduction of cuprous oxide to metallic copper. It is well known that carbon can reduce copper oxides to metallic copper at temperatures substantially lower than used in this process. The Ayers'patent, U.S. Pat. No. 2,554,319, which was previously referred to, recognized this problem. Ayers avoided over reduction by providing an essentially stoichiometric amount of carbon for the reduction of cupric to cuprous oxide. He also took care to grind both carbon and cupric oxide very finely, typically to minus 325 mesh, and to then thoroughly blend the reactants to obtain a homogeneous mixture.

Reduction of copper oxides by carbon under these conditions is a solid-solid reaction. Reaction of carbon with cuprous oxide is prevented in this invention by providing the carbon in the form of relatively large pieces or lumps, while the cupric oxide is in a relatively finely-divided form. Thus, there is provided sufficient carbon surface area for reaction with gaseous oxygen, while avoiding any significant degree of reduction to metallic copper. This coupled with a gaseous atmosphere, which is slightly oxidizing toward copper, precludes the presence of metallic copper in the reaction product.

The cupric oxide feed to the process is preferably in finely-divided form and may be decomposed as a powder or may be pelletized to prevent undue dusting during the reaction. Particle size of the cupric oxide feed is not critical so long as it is relatively small as compared to the size of the carbon scavenging agent pieces. It is preferred that the size of the carbon pieces be at least 100 fold larger than the size of the cupric oxide particles. In practice, carbon pieces about $3 \times 1 \times \frac{1}{2}$ provide very satisfactory results when used as a scavenger with cupric oxide particles as large as about 4 mesh. Carbon in the form of graphite is especially suitable as a scavenging agent because of its physical strength.

Carbon requirements are somewhat less than stoichiometric with respect to evolved oxygen when a flowing gas is used. Some oxygen, typically from about 10 to about 25% of that evolved, is carried from the reaction vessel entrained in the flowing gas. An excess of carbon is preferred and that excess may range as high as several times stoichiometric requirements without affecting product quality.

Time required to completely decompose the cupric oxide is, of course, quite dependent upon temperature. Reaction times will range from about 1 to 10 hours as temperature ranges from about 850° to 950° C. A preferred temperature range is from about 875° to 925° C as this provides a reasonably rapid reaction without danger of sintering the cupric oxide.

Cupric oxide from any source may be used as a feed material, but it is preferred to use mill scale or other byproduct cupric oxide because of the relatively low value of such materials. When byproduct cupric oxide is used, it becomes advantageous to provide a circulating gas through the reaction vessel which is slightly oxidizing to copper metal. Thus, metallic copper, which is often contained in byproduct materials, is oxidized to cuprous oxide, both by the action of the cupric oxide and by the action of the circulating gas.

Cuprous oxide is sensitive to reoxidation. The product cuprous oxide may be stabilized against reoxidation by coating the particle surfaces with an organic material, such as oleic acid. A wide variety of organic coating materials may be used provided that the coating is compatible with the desired end use of the cuprous oxide. Coating may be conveniently accomplished by dissolving the organic material in a volatile solvent, mulling the solution with particulate cuprous oxide and thereafter driving off the solvent.

An appreciation of the thermodynamic relationships exiting among the reaction components will aid in understanding the invention. As has previously been discussed, cupric oxide undergoes thermal decomposition at a significant rate at temperatures above about 850° C. Presence of a carbon scavenger in the reaction zone will result in the evolved oxygen reacting with carbon to form either carbon dioxide or carbon monoxide. These reactions can be summarized by the following two equations.

(1) $4 CuO + C = 2 Cu_2O + CO_2 \uparrow$; $K_{1200} = P_{CO_2} = 5 \times 10^{+15}$

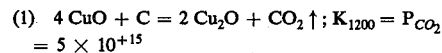

(2) $2 CuO + C = Cu_2O + CO \uparrow$; $K_{1200} = P_{CO} = 5 \times 10^8$

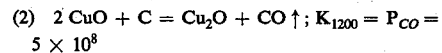

Combination of reactions (1) and (2) gives:

(3) $2 CuO + CO = Cu_2O + CO_2$; $K_{1200} = P_{CO_2}/P_{CO} = 10^7$

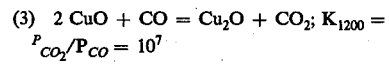

In order to produce only $Cu_2O$, one should avoid the formation of metallic copper from $Cu_2O$, as shown in the following equations:

(4) $2 Cu_2O + C = 4 Cu + CO_2$; $K_{1200} = P_{CO_2} = 1.4 \times 10^{10}$

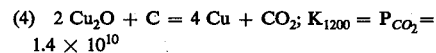

(5) $Cu_2O + CO = 2 Cu + CO_2$; $K_{1200} = P_{CO_2}/CO = 9860$

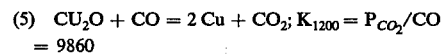

A comparison of reactions (3) and (5) indicates that reaction (3) is much more thermodynamically favorable than reaction (5). Hence, it is unlikely that any measurable amount of $Cu_2O$ will be converted to metallic copper so long as $CuO$ is present in the system. This conclusion was verified in the experimental work.

In the absence of $CuO$, it is possible for $Cu_2O$ to react with solid carbon to yield metallic copper is set out in equation (4). However, this is a solid-solid reaction and kinetics of the reaction will be very slow. The reaction can be further slowed by providing the carbon in lump form with low surface area in comparison to that of the copper oxides. Hence, the reaction should not proceed to any measurable extent and that has also been experimentally verified.

Another reaction to be examined is the possible thermal decomposition of $Cu_2O$ to yield metallic copper and oxygen. This reaction is set out as follows:

(6) $2 Cu_2O = 4 Cu + O_2$; $K_{1200} = P_{O_2} = 2.9 \times 10^{-8}$ atm.

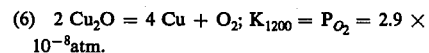

Evolved oxygen can then react with the carbon scavenger and the combined reaction is again summarized by equation (4). Because the equilibrium oxygen pressure of equation (6) is so low, it is apparent from a thermodynamic viewpoint that once $CuO$ is decomposed, no significant conversion of $Cu_2O$ to metallic copper will occur. This observation was also verified by experimental work.

The following examples more fully illustrate different aspects and specific embodiments of the process.

EXAMPLE 1

About 20g of plus 8-mesh cupric oxide pellets were placed in a zirconia boat. The loaded boat was then heated in a small horizontal tube furnace for 4 hours at 900° C while continuously flowing nitrogen gas through the tube at 0.5 1/min. The pellets were completely decomposed to cuprous oxide and analyzed 98.7% $Cu_2O$.

This experiment confirmed the thermodynamic data and demonstrates that cupric oxide can be decomposed to cuprous oxide if a sufficient inert gas flow is provided to carry away the evolved oxygen.

EXAMPLE 2

The procedure of Example 1 was attempted on a larger scale using a rotary Linder drum as a reaction vessel. In this experiment, a 1000g pellet sample was used and the nitrogen flow rate was increased to 25 1/min. After 4 hours at 900° C, only partial decomposition to cuprous oxide was obtained. It was concluded that the inert gas rate was not sufficient to adequately carry away the evolved oxygen.

EXAMPLE 3

The experiment of Example 2 was repeated with the addition of coarse graphite blocks measuring about 1 × 2 × ½ to the reaction chamber. Otherwise, the reaction conditions were unchanged. Conversion of cupric oxide to cuprous oxide was complete in about 3½ hours.

EXAMPLE 4

One hundred grams of cupric oxide was charged in a carbon-lined roasting drum held at a temperature of 900° C while nitrogen was flowed through the drum at 2 1/minute. Exit gas was periodically analyzed for carbon dioxide, oxygen and carbon monoxide. Maximum concentration of these three gases was 4.4%, 1.8% and 5.0% respectively. Concentration of all three gases in the nitrogen decreased and reached zero. At this time, the reaction was stopped and the product analyzed. Cuprous oxide content of the final product was 96.0%.

It can be seen from this test that completion of the decomposition reaction can be ascertained by monitoring the composition of the exit gas.

EXAMPLE 5

A two thousand gram sample of minus 8-mesh CuO pellets and 8 large pieces of electrode graphite, totaling 288 grams were heated in the Linder drum. Argon at 20 1/min. was flowed through the drum. The drum was rotated at 14 rpm. To prevent breakdown of the green cupric oxide pellets by the graphite pieces the pellets were heated to 800° C with the drum rotating at 4 rpm, then the graphite was charged, the drum heated to 900° C, and the speed of rotation increased to 14 rpm. At the end of 3½ hours, the sample was completely converted to $Cu_2O$. Some sticking and lumping of the pellets was encountered but this did not significantly affect the reaction. Analyses of the product are summarized in the following table:

Table 1

| Cu | Cu+ | Analyses, wt percent $Cu_2O$ | Fe | C |
|---|---|---|---|---|
| 84.4 | 82.3 | 97.7 | <0.1 | <0.1 |

EXAMPLE 6

The procedure of Example 5 was repeated except that the initial reaction temperature was reduced to 875° C. In order to alleviate the sticking and lumping problem, the CuO pellet size was increased to minus 4 plus 8-mesh. Samples were withdrawn for analysis every 30 minutes. As the reaction kinetics appeared to be slow at 875° C, the temperature was increased to 900° C at the end of 2 hours. Chemical analyses of the samples are summarized in the following table.

Table 2

| Sample | Time (Mins.) | Temp° C | Cu | Cu+ | $Cu_2O$ | Cu+/Cu × 100 |
|---|---|---|---|---|---|---|
| 1 | 30 | 875 | 79.5 | 13.1 | 14.8 | 16.5 |
| 2 | 60 | 875 | — | — | — | — |
| 3 | 90 | 875 | 81.7 | 40.7 | 45.8 | 49.8 |
| 4 | 120 | 875 | 82.5 | 49.9 | 56.1 | 60.5 |
| 5 | 150 | 900 | 86.1 | 74.4 | 83.6 | 86.4 |
| 6 | 180 | 900 | 87.6 | 81.1 | 91.4 | 92.6 |
| 7 | 210 | 900 | 87.6 | 85.9 | 96.7 | 98.0 |
| 8 | 240 | 900 | 88.3 | 87.6 | 98.5 | 99.2 |

These data clearly demonstrate the effect of temperature on reaction rate.

EXAMPLE 7

Cuprous oxide, prepared as described in Examples 5 and 6, was further processed for use as a pigment by grinding to minus 325-mesh. An analysis of the prepared pigment material was performed and the results were as follows:

Table 3

| Cu | Cu+ | Analyses, wt percent C° | Fe | C |
|---|---|---|---|---|
| 88.3 | 84.6 | 0.40 | <0.1 | <0.05 |

This sample met all of the requirements for pigment grade cuprous oxide set out in ASTM Standards, 1964, Part 20, "Tentative Specifications for Cuprous Oxide for Use in Antifouling Paints", except for the stability requirement. The stability specification requires that the loss of total reducing power will not exceed 2% after the pigment has been exposed for 72 hours to a 95% relative humidity atmosphere at 100° F.

Another pigment sample was prepared and was further treated by coating the particle surfaces with about 1% oleic acid. The coating was applied by dissolving oleic acid in acetone and mulling the solution and pigment for 10 minutes. Thereafter, the coated pigment was tested for stability. Results of the tests showed the pigment to analyze 99.32% total reducing power and an 0.2% loss of total reducing power, thus demonstrating that the product constituted a very high quality, pigment grade, cuprous oxide.

We claim:

1. A process for the production of cuprous oxide from cupric oxide which comprises heating said cupric oxide having a particle size ranging from about 4 mesh to minus 325 mesh in an atomosphere stable to cuprous oxide at a temperature in the range of about 875° to 925° in the presence of a solid, oxygen scavenging agent comprising carbon, said agent being the form of pieces at least 100-fold larger than the cupric oxide particles, for a time sufficient to decompose substantially all of the cupric oxide to cuprous oxide.

2. The process of claim 1 wherein said atmosphere comprises a flowing inert gas, said gas selected from the group consisting of nitrogen, argon and mixtures thereof.

3. The process of claim 1 wherein said atmosphere comprises a flowing gas which is stable toward cuprous oxide but unstable toward cupric oxide and metallic copper, said gas comprising carbon monoxide, carbon dioxide, water vapor and mixtures thereof.

4. The process of claim 1 wherein said carbon comprises graphite.

5. The process of claim 1 wherein the reaction time is in the range of 1 to 10 hours.

6. The process of claim 1 wherein said atmosphere comprises a flowing gas, said gas flowing at a rate sufficient to replace the total volume of gas within the reaction zone in a time ranging from 0.1 to 10 minutes.

7. The process of claim 1 wherein said cuprous oxide is coated with an organic material to prevent reoxidation thereof upon extended exposure to air.

* * * * *